Nov. 5, 1957

C. J. WESTLING 2,812,090

INDUSTRIAL TRUCK MOUNTED MATERIAL
HANDLING AND MANIPULATING DEVICE

Original Filed May 8, 1953

INVENTOR.
CARL J. WESTLING
BY Hooper, Leonard & Bull

HIS ATTORNEYS

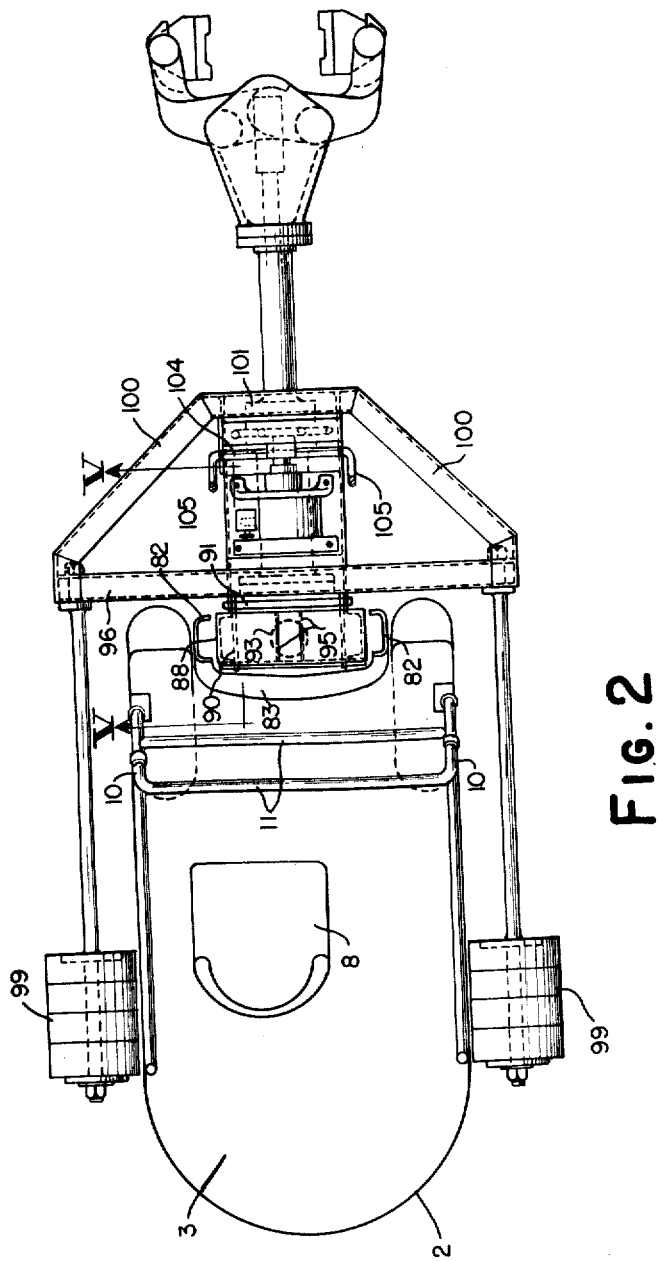

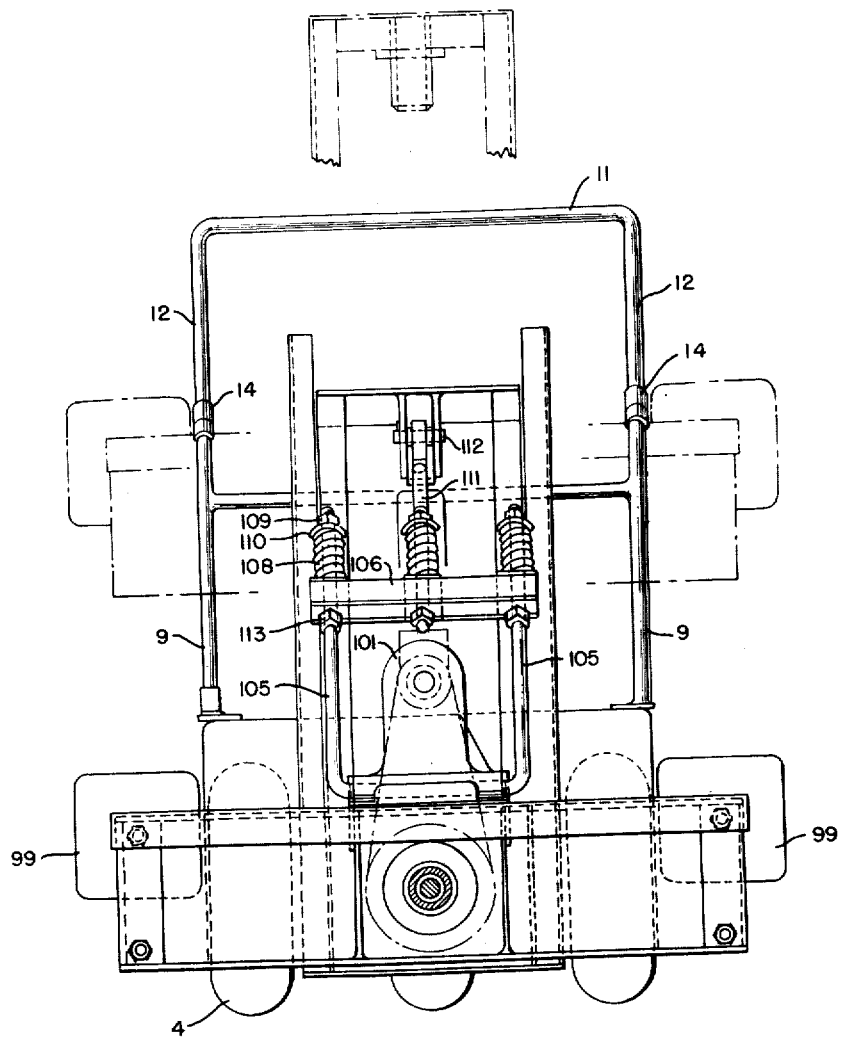

Nov. 5, 1957     C. J. WESTLING     2,812,090
INDUSTRIAL TRUCK MOUNTED MATERIAL
HANDLING AND MANIPULATING DEVICE
Original Filed May 8, 1953     6 Sheets-Sheet 4
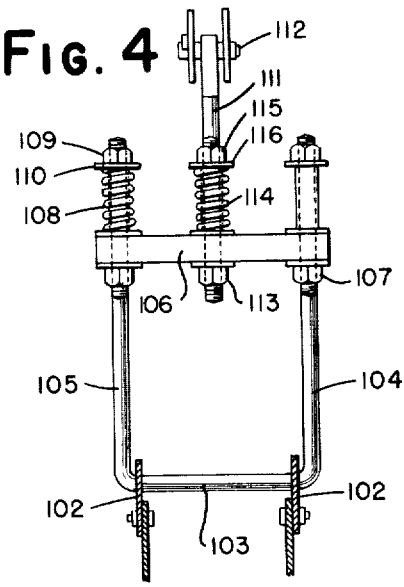
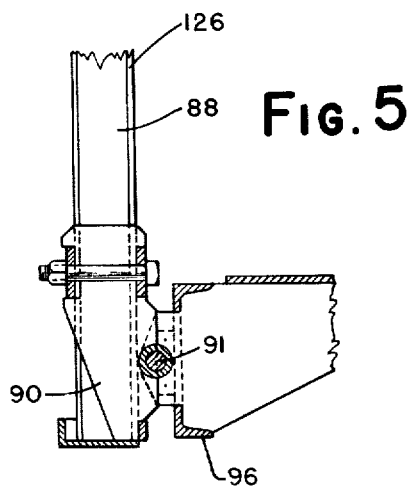
*INVENTOR.*
CARL J. WESTLING
BY *Hooper, Kenard & Buell*
*HIS ATTORNEYS*

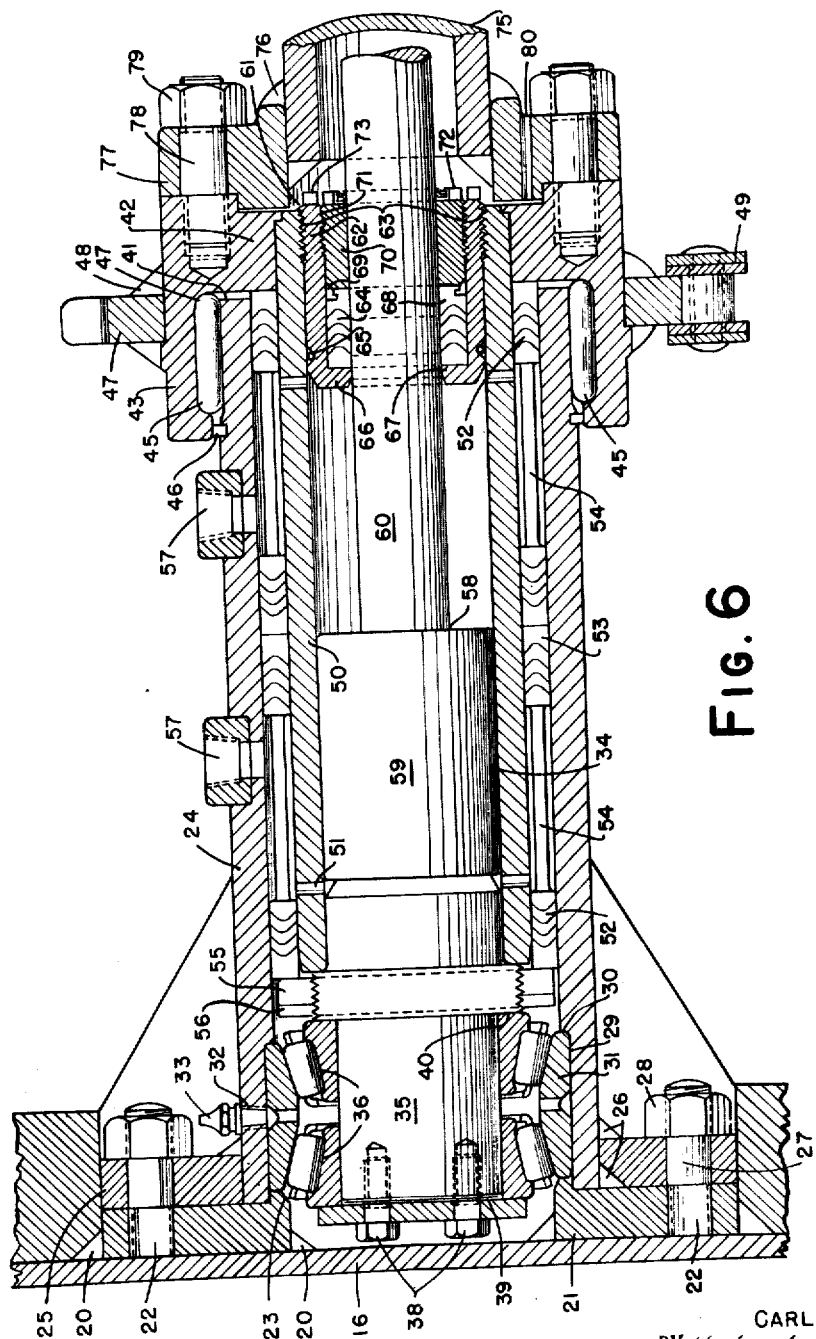

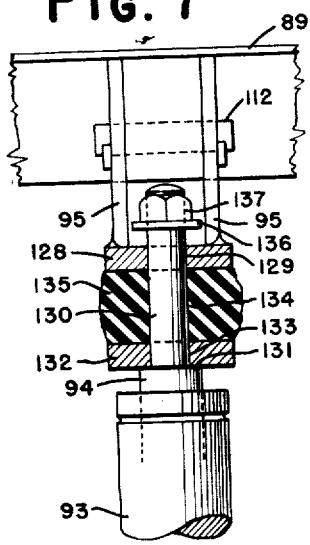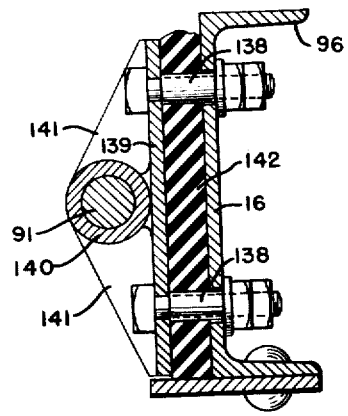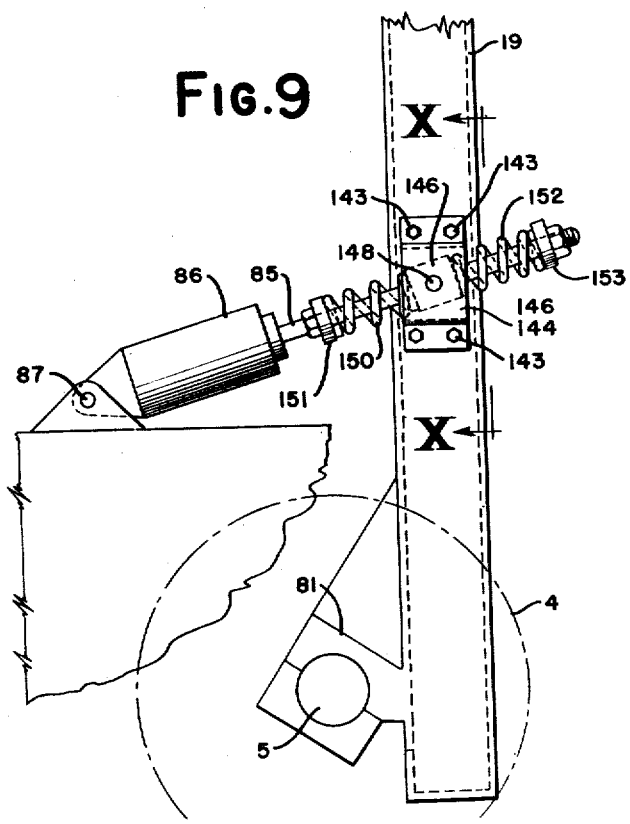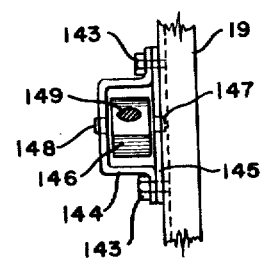

United States Patent Office 2,812,090
Patented Nov. 5, 1957

2,812,090
INDUSTRIAL TRUCK MOUNTED MATERIAL HANDLING AND MANIPULATING DEVICE

Carl J. Westling, Pittsburgh, Pa., assignor to Vulcan Research Corporation, Pittsburgh, Pa., a corporation of Pennsylvania Original application May 8, 1953, Serial No. 353,826. Divided and this application November 23, 1954, Serial No. 470,625

24 Claims. (Cl. 214—652)

This invention relates to a truck-mounted material handling device of general utility but especially useful for manipulating work for performance on the work of operations such, for example, as forging, for charging work into and withdrawing the same from heating furnaces and for similar uses in which heavy and usually hot masses are being manipulated. This application is a division of my copending application Serial No. 353,826, filed May 8, 1953.

Problems difficult of solution are presented in the efficient handling of heavy masses such as steel billets, particularly when the masses are at forging temperature. The masses during handling must be disposed at a sufficient distance from the operator so that the operator will not be overcome by their heat; also when the manipulator is used for charging the masses into and withdrawing the same from heating furnaces the peel or supporting arm must be of substantial length. It is not easy to support and manipulate a heavy mass at the tongs end of a long peel without considerably elongating the manipulator in the direction of the length of the peel away from the mass. Also vexing problems arise in protecting portions of the manipulator removed from the tongs from the shocks which are imparted to the peel during forging and other operations upon work carried by the peel.

I have devised a truck-mounted material handling device comprising a self-propelled wheeled truck of the type used for lifting and transporting articles which has load-lifting mechanism and a counterweighted load-carrying arm carried by the load-lifting mechanism. A generally horizontal pivot is preferably carried by the load-lifting mechanism and the counterweighted load-carrying arm is preferably carried by the load-lifting mechanism for pivotal movement about said pivot with the center of gravity of the arm being disposed somewhat inwardly of said pivot (i. e., away from the load) so that when the arm is carrying a load the center of gravity of the combined arm and load will be in the proximity of said pivot. However, advantages of my invention are obtainable even though the load-carrying arm is not pivoted to the load-lifting mechanism but instead is rigidly fastened thereto since, because the arm projects a considerable distance from the load-lifting mechanism, its action is similar to a turning movement about a pivot; thus my invention in its broadest aspect may include a truck-mounted material handling device in which the load-carrying arm or peel is rigidly fastened to the load-lifting mechanism although further important advantages are realized by pivoting the load-carrying arm to the load-lifting mechanism as will later appear.

The length of the load-carrying arm or peel will be determined for any particular material handling device or manipulator not merely by the reach required to serve a furnace or a hammer or press but, more importantly, so as to obtain the proper balance of mass so that when a load carried by the peel is subjected to the impact of a forging hammer the shock effects will be largely compensated for and not transmitted into the carrying chassis which in a truck of the type employed may not be constructed to withstand heavy shock loads. To accomplish this result the center of gravity of the combined peel and load when the manipulator is in use handling work should be at or very close to the forward point of support of the peel. The point of inflection in the moment diagram will fall near the forward point of support and shock effects are thus largely cancelled out at that point. Consequently, the center of gravity of unloaded peel should be somewhat to the rear of the forward point of support of the peel since the application of a load to the end of the peel moves the center of gravity of the loaded peel forwardly or toward the load.

I preferably provide resilient stabilizing means extending between and connected with the load-lifting mechanism and the load-carrying arm for resiliently maintaining the arm in substantially predetermined orientation. The load-carrying arm may be provided with counterweight means carried by the arm for shifting the center of gravity of the arm longitudinally of the arm to adapt the arm for different load carrying requirements. Such counterweight means may comprise a counterweight shiftable along the arm or a series of weights which may be applied and removed at will.

More specifically, I have devised a truck-mounted material handling device in which a self-propelled wheeled truck of the type used for lifting and transporting articles which has load-lifting mechanism is employed as the supporting and maneuvering element in which I have solved the existing problems so that heavy hot masses can be handled at the end of an elongated arm or peel without greatly extending the length of the device. I also minimize the shocks imparted to the truck when work carried by the device or manipulator is being forged. My device, which may for convenience be termed a lift truck manipulator, has a number of novel features from which advantages are realized as will appear below.

I provide a lift truck manipulator comprising a truck, a generally upright guideway carried by the truck, a crosshead guided by the guideway, means for moving the crosshead to selected positions in the guideway, a peel pivotally carried by the crosshead and resilient means maintaining the peel in approximately predetermined orientation but permitting pivotal movement of the peel relatively to the crosshead when shocks are imparted to the peel. I preferably provide connections between the guideway and the truck whereby the guideway is carried by the truck but movable to positions at selected angles to the horizontal. In a preferred structure the guideway is pivotally connected to the truck by a generally horizontal pivot and means are provided for moving the guideway about the pivot the position it at selected angles to the horizontal.

The peel preferably projects from the crosshead generally horizontally in one direction and counterbalancing means are preferably provided which are connected with the peel and project from the crosshead generally horizontally in the direction opposite that in which the peel projects. The peel preferably projects from the crosshead generally horizontally away from the truck and the counterbalancing means preferably lie generally alongside the truck. I prefer to employ two counterbalancing elements connected with the peel and projecting from the crosshead generally horizontally in the direction opposite that in which the peel projects and lying generally alongside the truck at opposite sides thereof.

The peel is preferably pivotally carried by the crosshead through a generally horizontal pivot and projects from the crosshead generally horizontally away from the truck and a transversely extending member is preferably provided which is connected with the peel and projects laterally therefrom in both directions, two counterbalancing elements being connected respectively to the oppositely projecting portions of the transversely extending member and projecting generally horizontally in the direction opposite that in which the peel projects and lying generally alongside the truck at opposite sides thereof. Resilient means are preferably provided maintaining the peel in approximately predetermined angular position relatively to the horizontal but permitting pivotal movement of the peel relatively to the crosshead when shocks are imparted to the peel.

A peel operating motor is preferably carried by the peel and flexible connections to the motor are provided for operating the same. The motor may be an electric motor, an oil motor or other type of motor suitable for operating the peel, the motor in the form shown being used for turning the peel about its axis.

The crosshead may be generally vertically elongated and the peel may be pivotally carried by the crosshead at the lower portion of the crosshead and may project generally horizontally from the crosshead, in which case the resilient means preferably extend from the upper portion of the crosshead to a portion of the peel substantially spaced from the crosshead maintaining the peel in approximately predetermined angular position relatively to the horizontal but permitting pivotal movement of the peel relatively to the crosshead when shocks are imparted to the peel.

The peel operating motor may be mounted atop the peel and the resilient means may have portions at opposite sides of the motor. In a preferred structure the resilient means may comprise a yoke having its cross element connected with the peel at a portion of the peel substantially spaced from the crosshead and having its side elements extending generally upwardly and toward the upper portion of the crosshead and resilient connections between the side elements and the upper portion of the crosshead. The peel preferably carries tongs at the outer end thereof in which case means are provided for operating the tongs to grip and release work.

To assist in absorbing shocks imparted to the peel resilient connections may be provided between the crosshead and the means for moving the crosshead in the guideway and/or between the peel and the crosshead and/or between the guideway and the means for moving the guideway about its pivotal connection with the truck. Such means may be employed individually or in various combinations depending upon the particular work to be done and one or more of them may be utilized with the resilient means maintaining the peel in approximately predetermined orientation but permitting pivotal movement of the peel relatively to the crosshead when shocks are imparted to the peel.

Other details, objects and advantages of the invention will become apparent as the following description of certain present preferred embodiments thereof proceeds.

In the accompanying drawings I have shown certain present preferred embodiments of the invention in which—

Figure 2 is a fragmentary top plan view of the lift truck manipulator shown in Figure 1;

Figure 3 is a front elevational view of the lift truck manipulator shown in Figures 1 and 2;

Figure 4 is a fragmenttary view partly in cross section of a portion of the structure shown in Figure 1;

Figure 5 is a fragmentary cross-sectional view taken on the line V—V of Figure 2;

Figure 6 is a fragmentary vertical central cross-sectional view to enlarged scale through a portion of the manipulator;

Figure 7 is a fragmentary view to enlarged scale partly in elevation and partly in vertical transverse cross section showing a modified form of connection between the crosshead and the means for moving the crosshead in the guideway;

Figure 8 is a fragmentary vertical longitudinal cross-sectional view to enlarged scale showing a modified form of connection between the crosshead and the peel;

Figure 9 is a fragmentary side elevational view to enlarged scale showing a modified form of connection between the guideway and the means for moving the guideway to turn it about its pivotal connection with the truck; and Figure 10 is a fragmentary vertical cross-sectional view taken on the line X—X of Figure 9.

Figure 1:
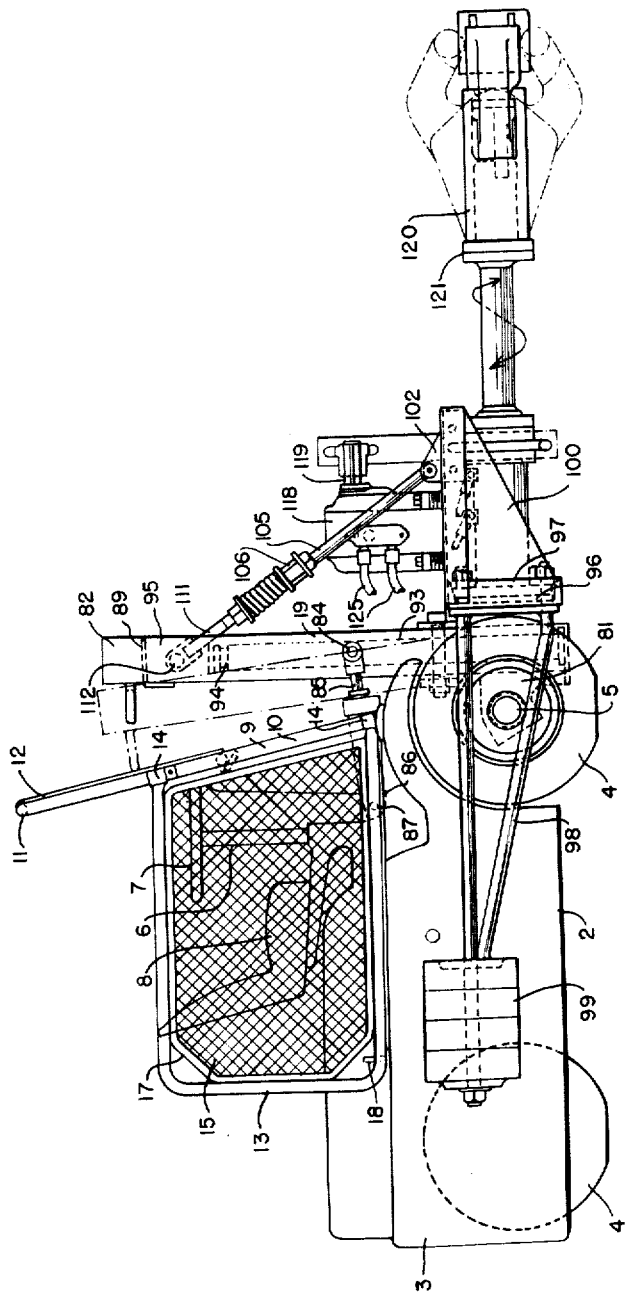
Figure 1 is a side elevational view of a lift truck manipulator.

Referring now more particularly to the drawings, the manipulator shown therein comprises a lift truck designated generally by reference numeral 2 comprising a body 3 mounted for movement from place to place upon a floor or track on wheels 4 shown as being rubber tired. Normally the manipulator operates upon a floor in which case the wheels 4 preferably have rubber tires as shown although the manipulator may be used upon a track in which case the wheels 4 may be flanged metal car wheels. In the structure shown there are two front wheels 4 mounted upon an axle 5 which may be driven to move the manipulator from place to place and a single rear wheel 4 mounted for turning movement in a generally horizontal plane to steer the truck. Steering gear which may be conventional is provided, the gear being operated through a shaft 6 provided with a steering wheel 7. The operator sits in a seat 8 mounted on the body 3. In front of the operator's seat and the steering wheel is a tubular steel frame 9 having upwardly extending and somewhat rearwardly inclined side members 10 and cross members 11. A heat shield 12 is mounted on the frame 9 to protect the operator from the heat of the work being handled by the manipulator or the heat of a furnace into which the work is charged or from which it is withdrawn. At each side of the driver's seat is a tubular metal frame 13 swingably mounted on the member 10 at that side of the body at 14 so that it can be swung outwardly to permit the operator or mechanic to get at or service the mechanism of the lift truck. Wire mesh 15 mounted in an inner frame 17 is mounted in each of the frames 13. A latch 18 is provided for latching each of the frames 13 in closed position. The side frames 13 when mounted as shown on the inclined side members 10 tend to swing by gravity to closed position. The side frames constitute guards to protect the operator from the rearwardly extending counterweight arms presently to be described.

Mounted on the front axle 5 for limited turning movement about the axis of the front axle is a frame 19. The frame 19 has at its bottom projecting portions 81 having bearing upon the axle 5 and opposed side members 82 connected by a cross member 83. The side members 82 are in the form of inwardly open channels and cooperatively form a guideway in which the manipulator crosshead, presently to be described, operates. The frame 19 has pivotally connected therewith at each side thereof at 84 a piston rod 85 connected with a piston in a cylinder 86 pivoted to the body 3 at 87 whereby the frame 19 may be moved through a small angle about the axis of the axle 5 to alter the inclination relatively to the horizontal of the manipulator crosshead and hence of the peel presently to be described which is carried by the crosshead. The frame 19 is shown in solid lines in Figure 1 in substantially vertically upright position and in chain lines in an angular position a few degrees removed from the solid line position and to the left. The frame 19 may likewise be turned to the right from the solid line position through a small angle by operation of the pistons in the cylinders 86.

The crosshead of the manipulator, which is designated generally by reference numeral 126, comprises elongated generally vertical side members 88 connected at the top by a transverse member 89 and having at the bottom members 90 to which is pivotally connected at 91 a cross member 96. Thus the crosshead 126 is generally vertical elongated. Mounted centrally at the bottom of the frame 19 is a cylinder 93 in which operates a piston having a piston rod 94 connected with the transverse member 89 of the crosshead through members 95. By operation of the piston in the cylinder 93 the crosshead is moved up and down in the guideway formed by the channels 82 and may be moved to selected positions in the guideway.

From the ends of the cross member 96 depend generally vertical members 97 rigidly connected with the cross member. Connected with and extending rearwardly from the cross member 96 and the members 97 at both sides of the body are arms 98 respectively carrying at their rearward ends counterweights 99. The purpose of the counterweights is to counterbalance the mass of the portions of the manipulator structure which projects forwardly from the pivot 91.

The mass of the portion of the manipulator structure which projects forwardly from the pivot 91 is counterbalanced for several reasons. Lift trucks are rated as to their lift capacity for specific loads which vary downwardly as the horizontal distance of the load from the vertical track of the lift truck increases. The maximum load capacity is attained when the load is close to the track. Consequently it is of considerable importance to design the manipulator structure so that the center of gravity of the manipulator mechanism is at or close to the vertical track. Moreover, it is important to obtain proper distribution of mass in the peel with respect to its support in order to minimize or cancel out the shocks to which the manipulator is subjected when work held by the manipulator is being forged. Such shocks if not properly compensated for could result in rapid deterioration of the lift truck and manipulator mechanism.

Projecting forwardly and inwardly from the ends of the cross member 96 are inclined members 100 joined at their forward ends by a transverse member 101. The member 101 carries a pair of upwardly projecting lugs 102 through which passes the cross element 103 of a yoke 104 having opposed generally upwardly and rearwardly inclined side members 105. A bar 106 extends transversely of the yoke 104 generally parallel to the cross element 103, each of the side members 105 of the yoke passing through the bar 106. The upper end of each of the members 105 is threaded and each such member has a nut 107 thereon below the bar 106. Each of the members 105 has a coil spring 108 disposed thereabout above the bar 106, a nut 109 and a washer 110 being applied above the spring.

A rod 111 is pivotally connected with the upper portion of the crosshead at 112 and extends downwardly and toward the right viewing Figure 1 and passes through the bar 106, a nut 113 being threaded onto the lower end of the rod 111 below the bar 106. A coil spring 114 surrounds the rod 111 above the bar 106 and a nut 115 and washer 16 are applied to the rod 11 above the spring 114.

Thus the crosshead and hence the peel carried thereby presently to be described is maintained in approximately predetermined orientation but is turnable about the axis of the pivot 91 when subjected to shock as when work being held by the peel is being forged. Clockwise turning of the crosshead about the axis of the pivot 91 viewing Figure 1 is resiliently resisted by the springs 108 on the members 105 while counterclockwise turning of the manipulator head is resiliently resisted by the spring 114 on the rod 111. Thus the shocks imparted to the peel are considerably reduced in intensity before they are transmitted to the truck. Since both the peel and the structure 100, 101, 102 are carried by and rigidly connected with the cross member 96 the yoke 104 is connected with and in effect acts on the peel; in other words, the structure 96, 100, 101, 102 may be regarded as part of the peel.

The cross member 96 has a web in the form of a plate 16 to which is welded at 20 a ring 21 into which bolts 22 are threaded. Any appropriate number of such bolts may be employed, it being my preference to use eight bolts equally spaced about the ring 21. The ring 21 has an inner axial annular flange 23.

The principal element of the support for the peel carrier and peel operator is a cylinder 24 having a flange 25 welded to one end at 26. The flange 25 is provided with bolt holes 27 to receive the bolts 22 and nuts 28 are applied to the bolts to the right of the flange 25 viewing Figure 6 and are drawn up tightly against the flange whereby to unitarily attach the cylinder 24 to the ring 21 and hence to the plate 16. Adjacent its left-hand end viewing Figure 6 the cylinder 24 is counterbored as shown at 29 and the end of the cylinder telescopes over the flange 23 as shown. The counterbore 29 provides a radial annular shoulder 30 within the cylinder 24. A bearing race 31 is disposed between the shoulder 30 and the end face of the flange 23 as shown in Figure 6. The parts are proportioned so that when the nuts 28 are tightened the bearing race 31 is maintained firmly in place and held against axial movement. The cylinder 24 has a bore 32 which is tapped and receives a lubrication fitting 33 through which lubricant may be introduced to lubricate the bearing within the bearing race 31.

The peel carrier, which is designated generally by reference numeral 34, comprises a cylindrical end portion 35 which is mounted for rotation in a bearing 36 disposed within the race 31. A plate 37 is bolted to the end of the peel carrier by bolts 38, there preferably being three such bolts having their axes arranged as the apices of an equilateral triangle equidistant from the axis of the peel carrier. Shims 39 may be provided between the end face of the peel carrier 34 and the plate 37 if needed. The bearing 36 not only provides for mounting of the peel carrier for rotation within the cylinder 24 but also maintains the peel carrier against axial movement. The bolts 38 are rendered accessible by removal of the cylinder 24 from the plate 16. The bearing is confined between a shoulder 40 of the peel carrier and the plate 37.

The outer extremity of the cylinder 24 is shown at 41. Slightly to the right of that extremity the peel carrier 34 has an annular radial flange 42. At the outer extremity of the flange 42 is an annular axial flange 43 which extends toward the left from the flange 42 viewing Figure 6. The flange 43 is provided at its inner surface with a bearing roller receiving cavity 44 in which are disposed bearing rollers 45 bearing against the outer face of the cylinder 24 at its right-hand extremity. A sealing ring 46 is provided to prevent ingress of foreign matter into the bearing comprising the rollers 45. Thus the peel carrier 34 is mounted for rotation within the cylinder 24 by the bearings 36 and 45 and is maintained against axial movement by the bearing 36. For turning the peel carrier 34 it is provided with a sprocket 47 which is welded to the exterior surface of the flange 43 as shown at 48. A sprocket chain 49 is trained about the sprocket 47 and about a driving sprocket 117, presently to be described, turning of the driving sprocket turning the peel carrier 34.

The peel carrier 34 has a cylindrical portion 50 whose outside diameter is substantially less than the inside diameter of the opposed portion of the cylinder 24. Ports 51 extend through the peel carrier 34 near the ends of the portion 50. Sealing rings 52 seal the peel carrier 34 to the cylinder 24 to the left of the left-hand ports 51 and to the right of the right-hand ports 51 viewing Figure 6. A double sealing ring 53 seals the peel carrier 34 to the cylinder 24 approximately midway between the sealing rings 52. Spacing rings 54 are disposed between the sealing ring 53 and the respective sealing rings 52. The right-hand extremity of the right-hand sealing ring 52 viewing Figure 6 abuts against the flange 42. A nut 55 is threaded onto an externally threaded portion 56 of the peel carrier 34 and is turned up against the left-hand face of the left-hand sealing ring 52. A lock nut 56 holds the nut 55 in position. Thus the sealing rings 52 and 53 and the spacing rings 54 are maintained in position on the peel carrier 34 and turn with the peel carrier when the peel carrier is turned within the cylinder 24. The spacing rings 54 have passages therethrough communicating respectively with the corresponding ports 51. Also, fluid passages 57 are provided through the cylinder 24 communicating with the respective passages through the spacing rings 54 and thence with the corresponding ports 51. By supplying fluid under pressure through one or the other of the passages 57 the peel operator now to be described may be operated within the peel carrier 34. When fluid under pressure is admitted through one or the other of the passages 57 the resultant axial thrust is self-contained within the peel carrier assembly and therefore the thrust does not affect or resist the turning movement of the peel.

The peel operator is designated generally by reference numeral 58 and has a portion disposed within the peel carrier 34 and a portion projecting to the right therefrom as shown in Figure 6. The peel operator 58 comprises a piston 59 operable within the cylindrical bore in the portion 50 of the peel carrier. A rod 60 is connected with the piston 59 and extends to the right therefrom viewing Figure 6.

I provide a sealing unit, designated generally by reference numeral 61, adapted to be applied to the right-hand end of the peel carrier 34 viewing Figure 6 to seal the rod 60 thereto while providing for axial movement of the peel operator. A sealing unit comprises a cup 62 snugly receivable in the right-hand end of the peel carrier 34 and adapted to be threadedly connected therewith through complementary threads 63. The cup 62 has an annular recess 64 receiving an O-ring 65 for sealing the cup to the interior of the peel carrier 34. The transverse wall 66 of the cup has therethrough a bore 67 to receive the rod 60, and a packing ring 68 is disposed within the cup to seal against the rod. The packing ring 68 has a reentrant portion 69 at its outer end to receive a hook-like tool for withdrawing it. The packing ring 68 is pressed into place by a pressure ring 70 threaded into the cup 62 by complementary threads 71. A seal 72 is provided to keep foreign matter out of the peel carrier when the rod 60 moves toward the left viewing Figure 6.

The packing ring 68 may be changed without removing the cup 62 or the entire sealing assembly may be removed if desired. Wrench engaging lugs 73 are provided on the cup 62 and similar lugs 74 are provided on the pressure ring 70.

The peel proper is designated 75 and comprises a tubular member to which is welded at 76 a flange 77 through which the peel is bolted to the peel carrier 34 by bolts 78 threaded into the flange 42. Nuts 79 are applied to the bolts 78. A passage 80 is provided through which any fluid leaking past the sealing unit 61 may emerge to indicate that a seal should be replaced.

Mounted atop the cylinder 24 is an oil motor 118 having a driven shaft 119 to which is fixed the previously mentioned sprocket 117. The sprocket chain 49 as above stated is trained about the sprocket 47 and about the sprocket 117 so that the motor 118 turns the peel carrier 34. Flexible oil connections 125 extend to the oil motor.

The peel 75 has tongs comprising a mounting member 120 connected therewith at 121. Pivoted to the mounting member 120 of the tongs at 122 are jaws 123 each in the form of a bell crank lever having one arm extending inwardly and having a pivot and slot connection 124 with the rod 60.

The tongs might be mounted directly against flange 42 without the interposition of the member 75 which has been referred to as the peel proper but which in the structure shown in the drawings constitutes a spacer tube which may be lengthened, shortened or dispensed with. The length of the tube 75 and of the rod 60 will, in any case, be determined to suit the particular operation for which the manipulator is furnished.

The portion of my manipulator structure shown in Figure 6 is unprecedentedly short-coupled and hence adapted for utilization in a lift truck manipulator. At the same time it is very strong and rugged and operates in a simple manner and is not likely to become out of order. Although such structure is exceptionally well adapted to employment in a lift truck manipulator it may also be used in other manipulators with advantages in economy of construction, strength, foolproofness and simplicity of operation.

Moreover, the portion of my manipulator structure shown in Figure 6 is unprecedentedly short-coupled for a mechanism which is intended to not merely operate the tongs at the end of the peel but also have a rotating action. Peel mechanisms have heretofore been proposed for charging work into and withdrawing the same from furnaces and the like which have been provided with tongs and means for operating the tongs but not with means for peel rotation. In such cases either the cylinders for operating the tongs have been mounted outside the peel structure or, if they have been within the peel structure on the peel axis, no provision has been made for rotatable connections for the admission of fluid under pressure at opposite sides of the piston. My structure as herein disclosed does away with all swivel connections, bulky piping and excessive axial length.

Figure 7 shows a resilient connection between the crosshead and the piston rod 94. The members 95 of the crosshead are connected, as by welding, with a washer-shaped member 128 which is therefore in effect a unitary part of the crosshead. The member 128 has therethrough a central bore 129. The piston rod 94 has an extremity 130 of reduced diameter making a shoulder 131 with the body of the piston rod. Seated on the shoulder 131 is a washer 132 having a central bore 133. The reduced extremity 130 of the piston rod passes through the bore 133 of the washer 132 and also through a bore 134 of a generally cylindrical block of rubber or other resilient material 135 and thence through the bore 129 of the member 128, after which a washer 136 and a nut 137 are applied to the extremity 130 as shown in Figure 7. Some of the shock imparted to the peel in the use of the manipulator may be absorbed by the resilient block 135. Normally the block may be under moderate compression between the washer 132 and the member 128 but when the peel is subjected to downward force the member 128 may move downwardly relatively to the piston rod 94 and further compress the block 135. Such a condition is illustrated in Figure 7 in which substantial clearance is shown between the bottom of the washer 136 and the top of the member 128. While normally the block 135 would not take the place of the resilient structure including the springs 108 and 114, it may be used in conjunction therewith or when the shocks to which the peel is subjected in use of the manipulator are of minor magnitude the block 135 may be used to replace the structure including the springs 108 and 114.

Figure 8 shows a resilient connection between the crosshead and the peel. Connected with the plate 16, which constitutes the web of the cross member 96, by bolts 138 is a plate 139 having integral therewith an eye 140 and strengthening flanges 141. The pivot pin 91 passes through the eye 140. Disposed between the plate 16 and the plate 139 is a mass of resilient material such as rubber 142. Normally the mass of resilient material 142 is maintained under moderate compression but it is subject to increased compression at any portion thereof due to shocks imparted to the peel in use of the manipulator. This feature may be used in combination with the structure including the springs 108 and 114 or in combination with other of the resilient connections herein disclosed to distribute the shocks imparted to the peel in use of the manipulator.

Figures 9 and 10 show a resilient connection between the guideway for the crosshead and the means for moving the guideway about its pivotal connection with the truck. The guideway is constituted by the frame 19 which has connected therewith at each side edge by bolts 143 a strap 144 and a plate 145. Turnably mounted within each strap is a block 146 having trunnions 147 and 148 rotatably mounted in the corresponding plate 145 and strap 144 respectively as shown in Figure 10. Each block 146 has therethrough a bore 149 through which the corresponding piston rod 85 passes. A compression coil spring 150 is biased between each block 146 and a collar 151 fastened to the corresponding piston rod 85 to the left of the block viewing Figure 9. A compression coil spring 152 is biased between each block 146 and a collar 153 fastened to the corresponding piston rod 85 to the right of the block viewing Figure 9. Thus the frame 19 is resiliently mounted for movement about the axis of the front axle 5 due to shocks imparted to the peel in use of the manipulator. This feature may be used separately or in combination with one or more of the other resilient features above described.

Thus I provide a lift truck manipulator which fully overcomes the disadvantages of prior manipulators and provides for the handling of heavy hot masses with a maximum of efficiency while maintaining the over-all length of the manipulator at a minimum. At the same time the truck is protected from the severe shocks imparted to the peel when the work is being operated upon. The lift truck manipulator is compact and rugged and requires little maintenance.

The structure shown in Figure 6 is not claimed in detail in this application but is claimed in my copending application Serial No. 320,287, filed November 13, 1952. Other subject matter shown but not claimed herein is claimed in my divisional application Serial No. 633,101, filed January 8, 1957.

While I have shown and described certain present preferred embodiments of the invention it is to be distinctly understood that the invention is not limited thereto but may be otherwise variously embodied within the scope of the following claims.

I claim:

1. A truck-mounted material handling device comprising a self-propelled wheeled truck of the type used for lifting and transporting articles which has load-lifting mechanism, a counterweighted load-carrying arm carried by the load-lifting mechanism and resilient stabilizing means extending between and connected with the load-lifting mechanism and the arm for resiliently maintaining the arm in substantially predetermined orientation.

2. A truck-mounted material handling device comprising a self-propelled wheeled truck of the type used for lifting and transporting articles which has load-lifting mechanism, a generally horizontal pivot carried by the load-lifting mechanism, a counterweighted load-carrying arm carried by the load-lifting mechanism for pivotal movement about said pivot and resilient stabilizing means extending between and connected with the load-lifting mechanism and the arm for resiliently maintaining the arm in substantially predetermined orientation.

3. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a load-carrying arm pivotally carried by the crosshead and projecting therefrom generally horizontally in one direction, counterbalancing means connected with the arm and projecting from the crosshead generally horizontally in the direction opposite that in which the arm projects and resilient means maintaining the arm in approximately predetermined orientation but permitting pivotal movement of the arm relatively to the crosshead when shocks are imparted to the arm.

4. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a load-carrying arm pivotally carried by the crosshead and projecting therefrom generally horizontally away from the truck, counterbalancing means connected with the arm and projecting from the crosshead generally horizontally in the direction opposite that in which the arm projects and lying generally alongside the truck and resilient means maintaining the arm in approximately predetermined orientation but permitting pivotal movement of the arm relatively to the crosshead when shocks are imparted to the arm.

5. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a load-carrying arm pivotally carried by the crosshead and projecting therefrom generally horizontally away from the truck, two counterbalancing elements connected with the arm and projecting from the crosshead generally horizontally in the direction opposite that in which the arm projects and lying generally alongside the truck at opposite sides thereof and resilient means maintaining the arm in approximately predetermined orientation but permitting pivotal movement of the arm relatively to the crosshead when shocks are imparted to the arm.

6. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a load-carrying arm pivotally carried by the crosshead through a generally horizontal pivot and projecting from the crosshead generally horizontally away from the truck, a transversely extending member connected with the arm and projecting laterally therefrom in both directions, two counterbalancing elements connected respectively to the oppositely projecting portions of the transversely extending member and projecting generally horizontally in the direction opposite that in which the arm projects and lying generally alongside the truck at opposite sides thereof and resilient means maintaining the arm in approximately predetermined angular position relatively to the horizontal but permitting pivotal movement of the arm relatively to the crosshead when shocks are imparted to the arm.

7. A truck-mounted material handling device comprising a self-propelled wheeled truck of the type used for lifting and transporting articles, a generally upright guideway carried by the truck, a generally vertically elongated crosshead guided by the guideway, means for moving the crosshead to selected positions in the guideway, a load-carrying arm pivotally carried by the crosshead at the lower portion of the crosshead and projecting from the crosshead generally horizontally in one direction, counterbalancing means connected with the arm and projecting from the crosshead generally horizontally in the direction opposite that in which the arm projects and resilient means extending from the upper portion of the crosshead to a portion of the arm substantially spaced from the crosshead maintaining the arm in approximately predetermined angular position relatively to the horizontal but permitting pivotal movement of the arm relatively to the crosshead when shocks are imparted to the arm.

8. A truck-mounted material handling device comprising a self-propelled wheeled truck of the type used for lifting and transporting articles, a generally upright guideway carried by the truck, a generally vertically elongated crosshead guided by the guideway, means for moving the crosshead to selected positions in the guideway, a load-carrying arm pivotally carried by the crosshead at the lower portion of the crosshead and projecting from the crosshead generally horizontally in one direction, counterbalancing means connected with the arm and projecting from the crosshead generally horizontally in the direction opposite that in which the arm projects, a yoke having its cross element connected with the arm at a portion of the arm substantially spaced from the crosshead and having its side elements extending generally upwardly and toward the upper portion of the crosshead and resilient connections between the side elements and the upper portion of the crosshead whereby the arm is maintained in approximately predetermined angular position relatively to the horizontal while pivotal movement of the arm relatively to the crosshead is permitted when shocks are imparted to the arm.

9. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm carried by the crosshead and a resilient connection between the crosshead and the means for moving the crosshead in the guideway to partially absorb shocks imparted to the arm.

10. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm carried by the crosshead and a connection including a mass of resilient material under compression between the crosshead and the means for moving the crosshead in the guideway to partially absorb shocks imparted to the arm.

11. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm pivotally carried by the crosshead, resilient means maintaining the arm in approximately predetermined orientation but permitting pivotal movement of the arm relative to the crosshead when shocks are imparted to the arm and a resilient connection between the crosshead and the means for moving the crosshead in the guideway to partially absorb shocks imparted to the arm.

12. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm and a connection including a mass of resilient material under compression between the arm and the crosshead to partially absorb shocks imparted to the arm.

13. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm pivotally carried by the crosshead, a resilient connection between the arm and the crosshead and resilient means maintaining the arm in approximately predetermined orientation but permitting pivotal movement of the arm relatively to the crosshead when shocks are imparted to the arm.

14. A truck-mounted material handling device comprising a self-propelled wheeled truck of the type used for lifting and transporting articles, a generally upright guideway carried by the truck, a crosshead guided by the guideway, means for moving the crosshead in the guideway, a load-carrying arm, a resilient connection between the arm and the crosshead and a resilient connection between the crosshead and the means for moving the crosshead in the guideway.

15. A truck-mounted material handling device comprising a self-propelled wheeled truck of the type used for lifting and transporting articles, a generally upright guideway pivotally connected to the truck by a generally horizontal pivot, means having a resilient connection with the guideway for moving the guideway about the pivot to position it at selected angles to the horizontal, a crosshead guided by the guideway, means for moving the crosshead in the guideway and a load-carrying arm carried by the crosshead.

16. A truck-mounted material handling device comprising a self-propelled wheeled truck of the type used for lifting and transporting articles, a generally upright guideway pivotally connected to the truck by a generally horizontal pivot, means having a resilient connection with the guideway for moving the guideway about the pivot to position it at selected angles to the horizontal, a crosshead guided by the guideway, means for moving the crosshead in the guideway, a load-carrying arm carried by the crosshead and a resilient connection between the crosshead and the means for moving the crosshead in the guideway to partially absorb shocks imparted to the arm.

17. A truck-mounted material handling device comprising a self-propelled wheeled truck of the type used for lifting and transporting articles, a generally upright guideway pivotally connected to the truck by a generally horizontal pivot, means having a resilient connection with the guideway for moving the guideway about the pivot to position it at selected angles to the horizontal, a crosshead guided by the guideway, means for moving the crosshead in the guideway, a load-carrying arm and a resilient connection between the arm and the crosshead.

18. A truck-mounted material handling device comprising a self-propelled wheeled truck of the type used for lifting and transporting articles, a generally upright guideway pivotally connected to the truck by a generally horizontal pivot, means having a resilient connection with the guideway for moving the guideway about the pivot to position it at selected angles to the horizontal, a crosshead guided by the guideway, means for moving the crosshead in the guideway, a resilient connection between the crosshead and the means for moving the crosshead in the guideway, a load-carrying arm and a resilient connection between the arm and the crosshead.

19. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a peel pivotally carried by the crosshead, means for positioning the peel in desired angular position relatively to the horizontal, a peel operating motor carried by the peel and flexible connections to the motor for operating the same.

20. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a peel pivotally carried by the crosshead, resilient means maintaining the peel in approximately predetermined angular position relatively to the horizontal but permitting pivotal movement of the peel relatively to the crosshead when shocks are imparted to the peel, a peel operating motor carried by the peel and flexible connections to the motor for operating the same.

21. A truck-mounted material handling device comprising a self-propelled wheeled truck of the type used for lifting and transporting articles, a generally upright guideway carried by the truck, a crosshead guided by the guideway, means for moving the crosshead to selected positions in the guideway, a peel pivotally carried by the crosshead through a generally horizontal pivot and projecting from the crosshead generally horizontally away from the truck, a transversely extending member connected with the peel and projecting laterally therefrom in both directions, two counterbalancing elements connected respectively to the oppositely projecting portions of the transversely extending member and projecting generally horizontally in the direction opposite that in which the peel projects and lying generally alongside the truck at opposite sides thereof, resilient means maintaining the peel in approximately predetermined angular position relatively to the horizontal but permitting pivotal movement of the peel relatively to the crosshead when shocks are imparted to the peel, a peel operating motor carried by the peel and flexible connections to the motor for operating the same.

22. A truck-mounted material handling device comprising a self-propelled wheeled truck of the type used for lifting and transporting articles, a generally upright guideway carried by the truck, a generally vertically elongated crosshead guided by the guideway, means for moving the crosshead to selected positions in the guideway, a peel pivotally carried by the crosshead at the lower portion of the crosshead and projecting generally horizontally from the crosshead, a peel operating motor mounted atop the peel, flexible connections to the motor for operating the same and resilient means having portions at opposite sides of the motor extending from the upper portion of the crosshead to a portion of the peel substantially spaced from the crosshead maintaining the peel in approximately predetermined angular position relatively to the horizontal but permitting pivotal movement of the peel relatively to the crosshead when shocks are imparted to the peel.

23. A truck-mounted material handling device comprising a self-propelled wheeled truck of the type used for lifting and transporting articles, a generally upright guideway carried by the truck, a generally vertically elongated crosshead guided by the guideway, means for moving the crosshead to selected positions in the guideway, a peel pivotally carried by the crosshead at the lower portion of the crosshead and projecting generally horizontally from the crosshead, a yoke having its cross element connected with the peel at a portion of the peel substantially spaced from the crosshead and having its side elements extending generally upwardly and toward the upper portion of the crosshead, resilient connections between the side elements and the upper portion of the crosshead whereby the peel is maintained in approximately predetermined angular position relatively to the horizontal while pivotal movement of the peel relatively to the crosshead is permitted when shocks are imparted to the peel, a peel operating motor mounted atop the peel between the side elements of the yoke, flexible connections to the motor for operating the same, connections between the motor and the peel through which the motor turns the peel and means for operating the peel to grip and release work.

24. A truck-mounted material handling device comprising a self-propelled wheeled truck of the type used for lifting and transporting articles, a generally upright guideway carried by the truck, a generally vertically elongated crosshead guided by the guideway, means for moving the crosshead to selected positions in the guideway, a peel pivotally carried by the crosshead at the lower portion of the crosshead and projecting generally horizontally from the crosshead, tongs carried by the peel at the outer end thereof, a yoke having its cross element connected with the peel at a portion of the peel substantially spaced from the crosshead and having its side elements extending generally upwardly and toward the upper portion of the crosshead, resilient connections between the side elements and the upper portion of the crosshead whereby the peel is maintained in approximately predetermined angular position relatively to the horizontal while pivotal movement of the peel relatively to the crosshead is permitted when shocks are imparted to the peel, a peel operating motor mounted atop the peel between the side elements of the yoke, flexible connections to the motor for operating the same, connections between the motor and the peel through which the motor turns the peel and means for operating the tongs to grip and release work.

References Cited in the file of this patent

UNITED STATES PATENTS

| | | |
|---|---|---|
| 1,538,168 | Cochran | May 19, 1925 |
| 1,633,557 | Morgan | June 21, 1927 |
| 1,828,762 | Brosius | Oct. 27, 1931 |
| 1,868,562 | Chubb et al. | July 26, 1932 |
| 1,881,169 | Brosius | Oct. 4, 1932 |
| 2,211,088 | Arnold | Aug. 13, 1940 |
| 2,257,546 | Dienenthal et al. | Sept. 30, 1941 |
| 2,345,572 | Brosius | Apr. 4, 1944 |
| 2,494,584 | Rouse | Jan. 17, 1950 |
| 2,578,070 | Jones | Dec. 11, 1951 |
| 2,590,355 | Turner et al. | Mar. 25, 1952 |
| 2,677,475 | Davies et al. | May 4, 1954 |
| 2,741,374 | Morgan | Apr. 10, 1956 |

U. S. DEPARTMENT OF COMMERCE
PATENT OFFICE

CERTIFICATE OF CORRECTION

Patent No. 2,812,090                                        November 5, 1957

Carl J. Westling

It is hereby certified that error appears in the printed specification of the above numbered patent requiring correction and that the said Letters Patent should read as corrected below.

Column 2, line 54, for "pivot the" read -- pivot to --; column 3, line 67, for "fragmenttary" read -- fragmentary --; column 5, line 3, for "vertical" read -- vertically --; line 58, for "16" read -- 116 --; same line, for "11" read -- 111 --; column 11, line 52, for "relative" read -- relatively --.

Signed and sealed this 1st day of April 1958.

(SEAL)
Attest:
KARL H. AXLINE

Attesting Officer

ROBERT C. WATSON
Commissioner of Patents